US006257826B1

(12) United States Patent
Neagle et al.

(10) Patent No.: US 6,257,826 B1
(45) Date of Patent: Jul. 10, 2001

(54) PACKAGE HANDLING APPARATUS AND METHOD

(75) Inventors: Claud Andrew Neagle, Edgewood, KY (US); Jean Marti, Kleve (DE)

(73) Assignee: Kisters Kayat, Inc., Edgewater, FL (US)

( * ) Notice: Subject to any disclaimer, the term of this patent is extended or adjusted under 35 U.S.C. 154(b) by 0 days.

(21) Appl. No.: 09/156,983

(22) Filed: Sep. 18, 1998

(51) Int. Cl.[7] ................................................ B65G 57/00
(52) U.S. Cl. ............................ 414/799; 414/802; 414/922
(58) Field of Search .................................. 414/799, 802, 414/788.9, 789.6, 789.3, 791.6, 792, 792.4, 922

(56) References Cited

U.S. PATENT DOCUMENTS

| | | | |
|---|---|---|---|
| 4,067,456 | * | 1/1978 | Schmitt .................................. 198/105 |
| 4,255,074 | * | 3/1981 | Meratti et al. ......................... 414/62 |
| 4,271,755 | * | 6/1981 | Kintgen et al. ........................ 414/907 |
| 4,439,084 | * | 3/1984 | Werkheiser ............................. 414/82 |
| 4,567,981 | | 2/1986 | Headon . |
| 4,704,060 | * | 11/1987 | Winski et al. ......................... 414/907 |
| 4,801,024 | | 1/1989 | Flum et al. . |
| 4,976,584 | * | 12/1990 | Focke ................................ 414/789.6 |
| 5,141,274 | * | 8/1992 | Hayden et al. ..................... 414/789.5 |
| 5,320,478 | | 6/1994 | Gonsowski . |
| 5,330,050 | | 7/1994 | Stansbury et al. . |
| 5,338,150 | * | 8/1994 | Focke et al. ........................... 414/799 |
| 5,372,472 | * | 12/1994 | Winski et al. ........................ 414/799 |
| 5,538,391 | | 7/1996 | Bonnet . |
| 5,547,081 | | 8/1996 | Mullock et al. . |
| 5,623,808 | | 4/1997 | Franklin et al. . |
| 5,638,950 | | 6/1997 | Benno . |
| 5,640,832 | | 6/1997 | Black . |
| 5,765,336 | * | 6/1998 | Neagle et al. .......................... 53/201 |

\* cited by examiner

Primary Examiner—Douglas Hess
(74) Attorney, Agent, or Firm—R. Christian Macke (57) ABSTRACT

A package handling apparatus. The layout of each layer of a palletized stack may be individually defined by an operator on a personal computer by graphically arranging packages into a desired layout on the computer. The personal computer communicates to a programmable logic controller which controls handlers. Packages from an exit conveyor of a packaging machine are positioned and oriented onto a pre-palletization conveyor by the handlers. The desired layout is achieved when the positioned and oriented packages reach a compression station and are compressed together. The layout of packages, forming a layer for a pallet, is then stacked onto the pallet for shipping. A related method for handling and assembling packages is also disclosed.

6 Claims, 10 Drawing Sheets

PRIOR ART

PACKAGE HANDLING APPARATUS AND METHOD

FIELD OF THE INVENTION

The present invention relates to a method and apparatus for the arranging of packages into a desired layout for palletization and shipment. Programmable package handlers allow the layout of each layer of a palletized stack to be defined differently.

BACKGROUND OF THE INVENTION

The secondary packaging of articles into packages appropriately sized for use by consumers has become an important phase of the manufacturing of many products. Shipment of these consumer packages, however, has created problems in shipping to retailers. Specifically, the small consumer packages have necessitated another step of packaging associated with shipment comprising assembling the consumer packages into layers to be stacked.

One specific example of the primary and seconding packaging of articles and assembly of pallet layers for shipment is found in the distribution of beverages, which are primarily packaged in cans or bottles, then secondarily packaged into consumer multi-packs of various sizes, most frequently six, twelve or twenty-four packs of cans or bottles. The multi-packs are arranged into layers and stacked onto a pallet for shipment from the manufacturer/bottler to the distributer or retailer. The secondary packaging of multi-packs in paperboard, cardboard, film or some combination of cardboard and film is followed by assembly of a number of multi-packs into a layer to be stacked onto a pallet. The assembled layer is then stacked onto the pallet by a palletizer.

Prior art devices and methods for assembling packages into layers for stacking onto a pallet include means for arranging the packages into layers in which the packages are uniformly oriented. However, a disadvantage of such uniform orientation is that, as each layer is stacked on top of the preceding layer, what is essentially created is a number of vertical stacks of the packages. That is, because each layer is identically arranged, vertical columns are the result of each package of a layer being placed squarely on the similarly positioned package of the preceding layer.

As the flexibility of packaging machines has increased, and the number of consumer packages of different sizes has increased, one trend has been the development of smaller consumer packages. The stacking and palletization of the smaller consumer packages has become problematic, however, because the vertical columns of packages created by the stacking of uniform layers have become more unstable. To stabilize the vertical columns of the palletized stacks, prior art stacking techniques and devices have included the use of intermediate layers of cardboard or packing material between layers and, in many instances, the use of film around the palletized stacks.

Typically the packages being assembled into layers and stacked on a pallet are not square, but rather are rectangular and have one side longer than the other. This difference is important and can be advantageous in improving the stability of the palletized stacks. By alternating the orientation of the packages, and assembling individual layers of the palletized stacks differently, the placement of packages onto packages of the preceding layer can be offset so that unstable vertical columns of packages are not created. Rather, the offset of the packages on successive layers allows interlocking to stabilize the palletized stack, thereby reducing or eliminating the need for additional support or stabilizing material such as intermediate layers of cardboard, paperboard, or use of film.

One prior art attempt to solve the problem of the instability of vertical columns by altering the layout of layers of the palletized stack is embodied in U.S. Pat. No. 5,320,478 to Gonsowski, et. al. The apparatus disclosed therein recognized the problem of instability of stacking small items on a pallet and solved the problem by alternately turning packages to vary the layout of successive layers of the stack. In the '478 Gonsowski apparatus a fixed turning mechanism is provided which turns and reorients packages that have been directed toward the turning mechanism by a laning mechanism.

The prior art solutions, including the '478 Gonsowski patent, have failed to provide a flexible means for assembling the packages into layers of various layouts in forming the palletized stack. An apparatus and method by which each layer of a palletized stack may be defined differently is advantageous because it increases the interlocking between layers and thereby, improves the stability of the palletized stack. An apparatus having a programmable package handler which receives each package individually and places and orients the package appropriately to provide a desired layout comprises such a solution and is advantageous over the prior art.

There is thus identified a need for a flexible apparatus and method allowing the assembly of packages into desirable and variable layouts for successive layers of a palletized stack. Alternating the layout of successive layers in this way is beneficial because the stability of the palletized stack is improved.

OBJECTS OF THE INVENTIONS

Accordingly it is an object of the present invention to provide an apparatus for receiving packages from a packaging machine and assembling them into a desired layout prior to stacking onto a pallet for shipment.

It is also an object of the present invention to provide a method for receiving packages from a packaging machine and assembling them into a desired layout prior to stacking onto a pallet for shipment.

It is an object of the present invention to provide a method for receiving packages from a packaging machine, positioning and orienting them onto a pre-palletization conveyor and, thereby, assembling the packages into a desired layout to be stacked onto a pallet for shipment.

Another object of the present invention is to provide a package handling apparatus wherein an operator defines the layout of packages assembled into a layer of a palletized stack through simple graphic arrangement on a computer screen.

Yet another object of the present invention is to provide an apparatus for assembling packages into a desired arrangement utilizing package handlers that are controlled by a programmable logic controller.

A further object of the present invention is to provide a programmable package-handling apparatus that is programmed to change the layout of each layer of a palletized stack to avoid repetition and thereby improve the stability of the palletized stack.

Yet another object of the present invention is to provide a package handling apparatus having handlers that can receive a variety of different sized packages and can grip, position and orient the packages onto a pre-palletization conveyor to create a desired layout.

Another object of the present invention is to provide an apparatus for receiving packages from a packaging machine, positioning and orienting the packages on a pre-palletization conveyer to create a desired layout, collecting the packages at a collection station, and compressing the packages into tight face-to-face engagement just prior to stacking the layer onto the pallet.

Yet another object of the present invention is to provide an apparatus for receiving packages from a packaging machine and assembling them into a desired layout for stacking onto a pallet which does not require lane dividers.

Another object of the present invention is to provide a method for handling and assembling packages into a user defined layout comprising the steps of receiving packages from a packaging machine, positioning and orienting the packages onto a pre-palletization conveyor to create a desired layout, collecting the packages at a collection station, and compressing the packages into the desired layout prior to placement on the palletized stack.

These and other objects of the present invention are satisfied by the preferred embodiment of the invention described in more detail herein. These objects are meant to be illustrative and not limiting. The manner of operation, novel features and further objects and advantages of this invention may be better understood by reference to the description and drawings set forth herein.

SUMMARY OF THE INVENTION

According to the foregoing objectives, this invention is an apparatus for handling packages comprising a pre-palletization conveyor and at least one handler which receives packages from an infeed conveyor. The handler has means for positioning the packages onto the pre-palletization conveyor and is controlled by a programmable device such that the packages are arranged into a user-defined layout. A means for compressing the packages, after arrangement on the pre-palletization conveyor, is also provided.

The present invention comprises a package handling apparatus wherein the layout of each layer of a palletized stack is individually assembled. In the preferred embodiment eight (8) individual handlers receive packages from an infeed conveyor, typically the exit conveyor from a packaging machine. The handlers grip the packages and position and orient them onto a pre-palletization conveyor.

Positioning of the packages is performed by driving each handler along an axis, moving a package along with it, while orientation of the packages is selectively altered by rotating a portion of the handler. The handlers comprise air actuated flaps that receive and grip the packages from the front, rear and sides so that, as each handler is driven along the axis comprising an overhead mounted track, the package is transported therewith. The means for rotating the handlers allows the flaps and package to be turned up to 90 degrees, thereby altering the orientation of the handler and package.

A graphic depiction of a layout of packages to be assembled into a layer of the palletized stack is presented on a personal computer. The computer also provides the means for an operator to define and alter the layout of a layer of a palletized stack. The layout defined by the operator is implemented through communications with a programmable logic controller which controls the handlers, positioning means and orienting means. Specifically, the programmable logic controller controls the movement of the handler along the axis, and also controls the selective rotation and altering of the orientation of the handler and the package.

A method for handling packages and arranging them into a desired layout is also provided. The first step is the receiving of the packages from an infeed conveyor. Defining the desired layout of the packages by a user is the next step. Positioning and orienting of the package onto a pre-palletization conveyor to conform with the desired layout is then carried out. The next step is to convey the properly positioned and oriented packages to a compression station. The packages are then compressed into face-to-face engagement in the desired layout. Finally, the layer is stacked onto a pallet.

DETAILED DESCRIPTION OF THE INVENTION

Figure 1:
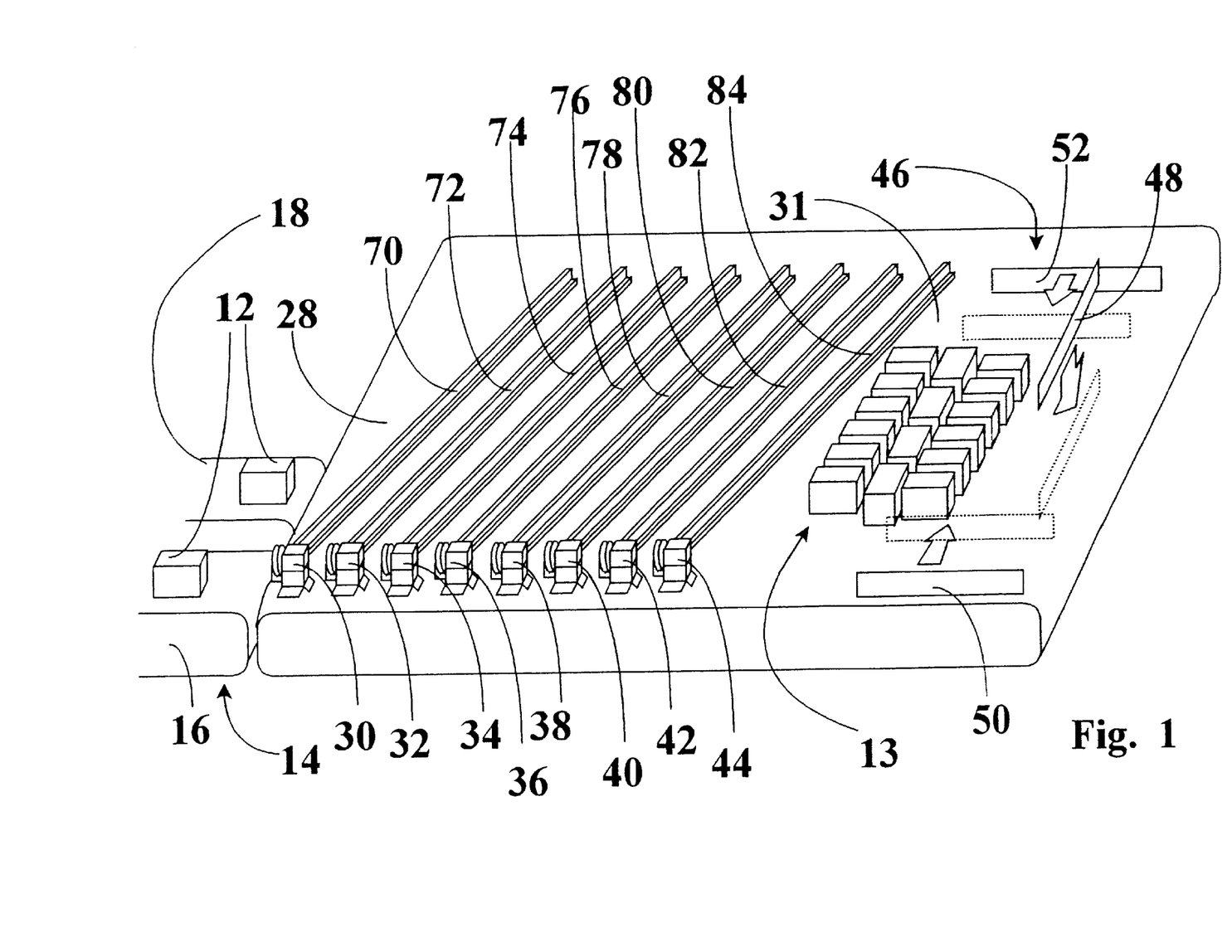
FIG. 1 is a perspective view of the package handling apparatus of the present invention.

The package handling apparatus 10 of the present invention is illustrated in FIG. 1. The apparatus 10 assembles packages 12 received from a packaging machine into a desired layout 13 for palletization. The apparatus 10 specifically receives the packages 12 from an infeed means 14 and manipulates the position and orientation of the packages 12 into the desired layout 13 just prior to being stacked for shipment onto a pallet. The package handling apparatus 10 is programmable so that minimal time and effort are required to change the desired layout 13 to a new format.

Figure 3:
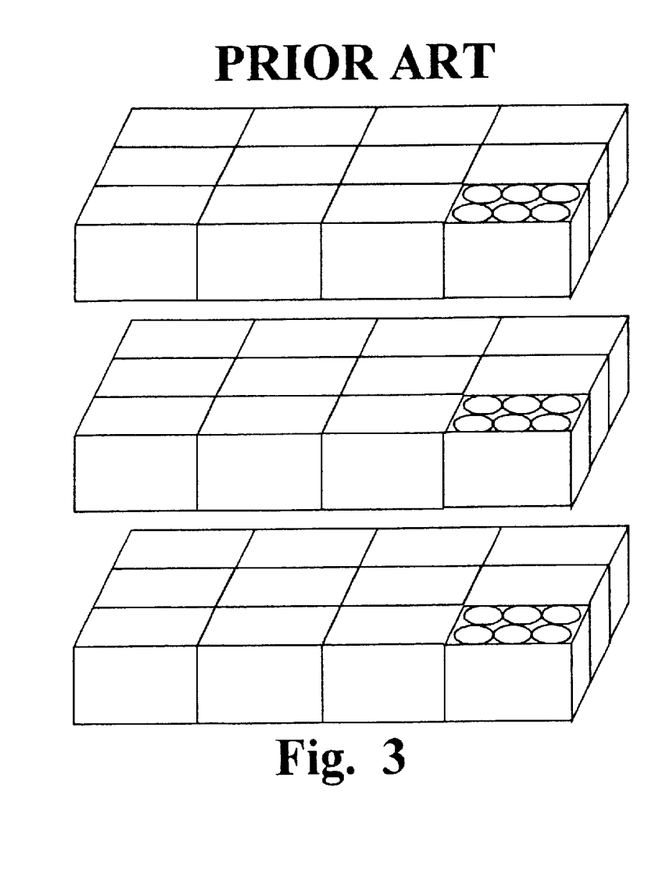
FIG. 3 is a perspective representation of layers of a palletized stack uniformly assembled by a prior art package handling apparatus.
Figure 4:
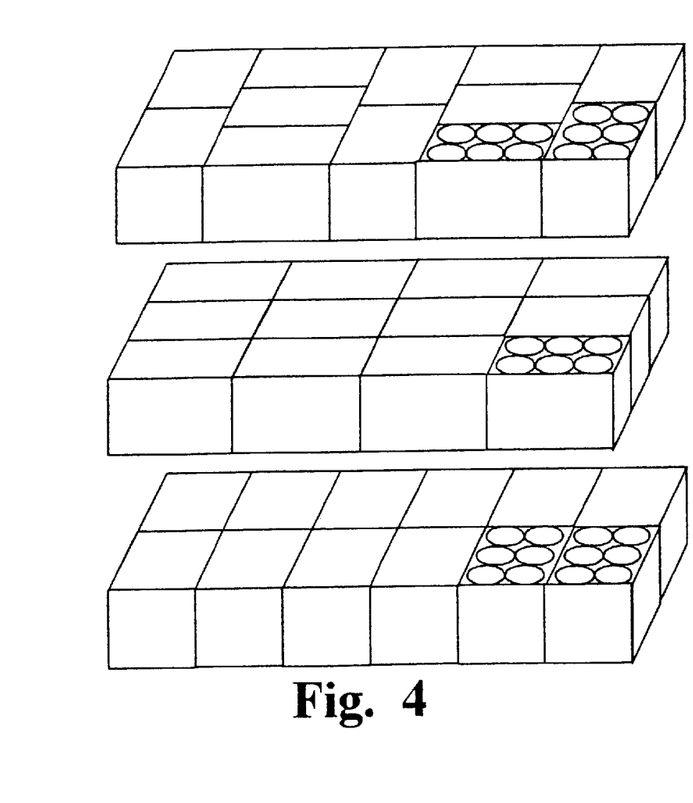
FIG. 4 is a perspective representation of three layers of a palletized stack of packages assembled in differing layouts by the apparatus of the present invention.
Figure 5:
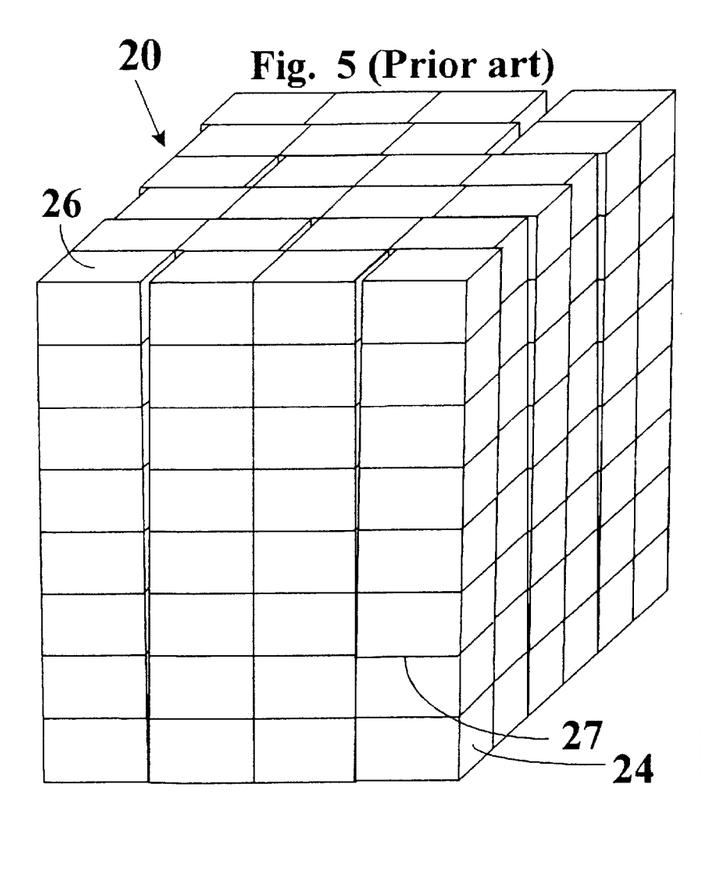
FIG. 5 is a perspective representation of a palletized stack resulting from a package handling apparatus known in the prior art wherein layers are uniformly assembled, thereby creating vertical columns.
Figure 6:
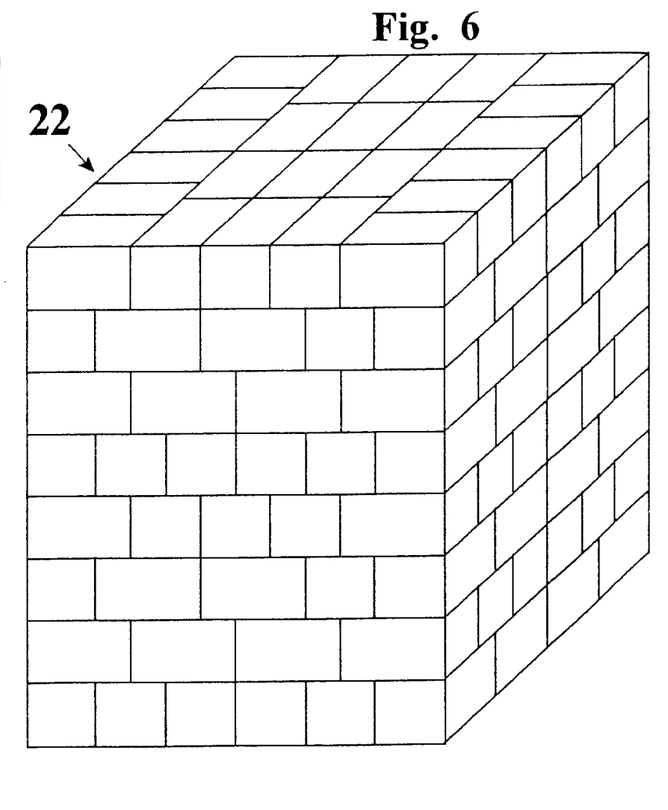
FIG. 6 is a perspective representation of an example of a palletized stack resulting from the package handling apparatus of the present invention wherein layers are variably assembled to create overlapping and interlocking packages to stabilize the entire stack.

As a result of altering the layout 13 of packages 12 of successive layers of a palletized stack, a nonuniform palletized stack 20 is created (FIG. 6). A prior art package handling apparatus creating the same layout for every layer results in a uniform stack 22 having uniform layers 24, as depicted in FIGS. 3 and 5. A significant disadvantage of such uniform layers 24 is that vertical columns 26 of packages 12 are created because there is no interlocking or overlap between layers. These vertical columns 26 lack stability and, to prevent the columns from falling during shipment, an intermediate layer 27 of support material or film is typically required to maintain the integrity of the palletized stack 22.

The package handling apparatus 10 of the present invention receives packages 12 from a infeed means 14, in the preferred embodiment comprising dual infeed conveyors 16, 18. Generally, the infeed means 14 comprises the exit conveyor from a packaging machine. Each package 12 moves from the infeed conveyor 16, 18 onto the pre-palletization conveyor 28 by means of handlers 30, 32, 34, 36, 38, 40, 42, 44. While the preferred embodiment of the present invention shows eight (8) handlers 30, 32, 34, 36, 38, 40, 42, 44, it is specifically contemplated that more or less handlers may be used without departing from the principles of the present invention. Specifically, the principles of the present invention merely contemplate the use of at least one handler means 30 to receive, position and orient the packages 12 from the infeed means 14.

Figure 2:
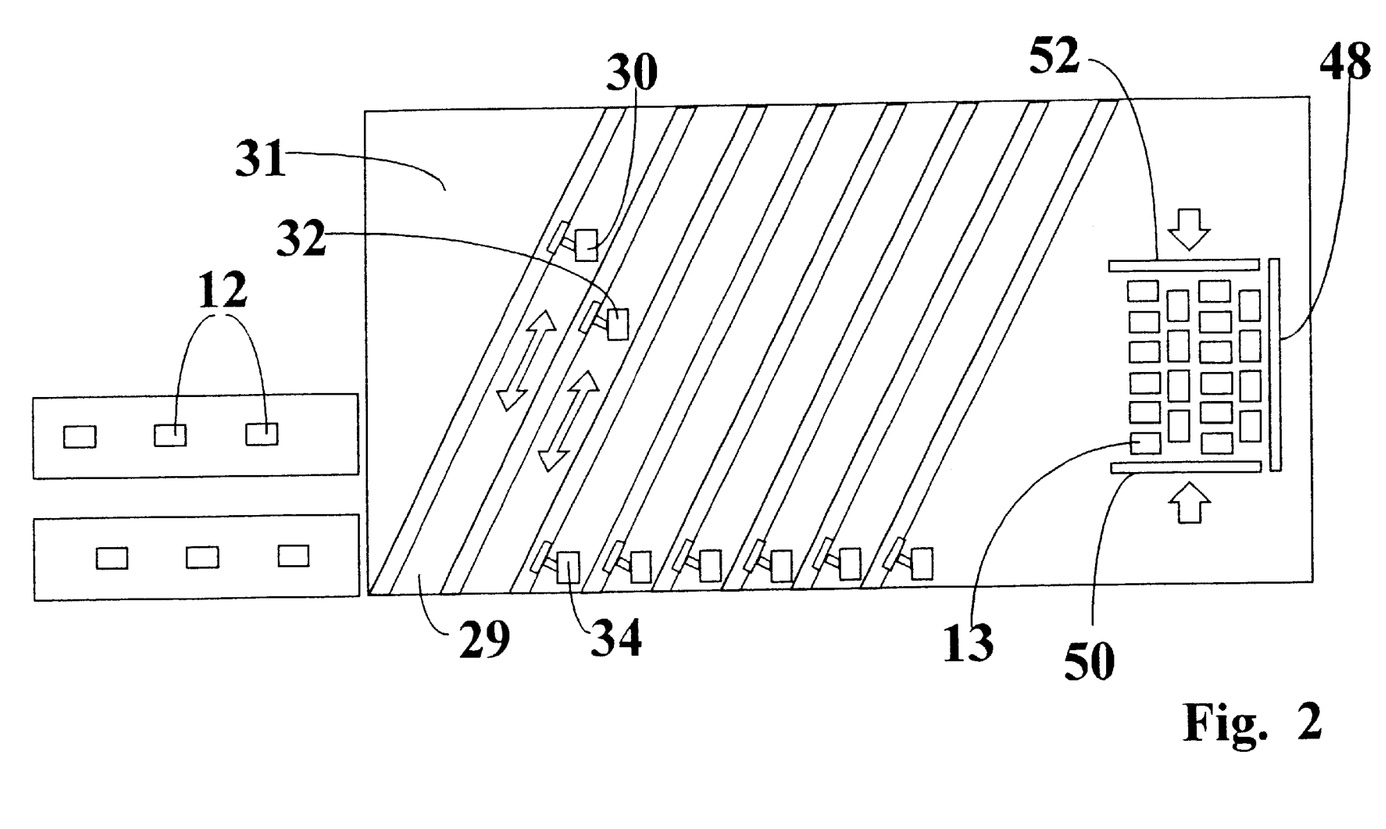
FIG. 2 is a top view of the package handling apparatus of the present invention illustrating movement of the handlers on their axes.

The handlers 30, 32, 34, 36, 38, 40, 42, 44, suspended over the pre-palletization conveyor 28, receive, position and orient packages 12 by transferring the packages 12 from a section 29 of the pre-palletization 28 proximate to the infeed means 14 to a section 31 of the pre-palletization conveyor 28 on which the layout 13 is crudely formed (FIG. 1). In the preferred embodiment, the handlers 30 32, 34, 36, 38, 40, 42, 44 receive, position and orient packages 12 by moving them at an angle across the pre-palletization conveyor 28 (FIGS. 1 and 2). Although each of the handlers 30 32, 34, 36, 38, 40, 42, 44 moves along an angular axis 70, 72, 74, 76, 78, 80, 82, 84 in the preferred embodiment, it is specifically contemplated that the angle can be increased or decreased without departing from the principles of the present invention.

Figure 7:
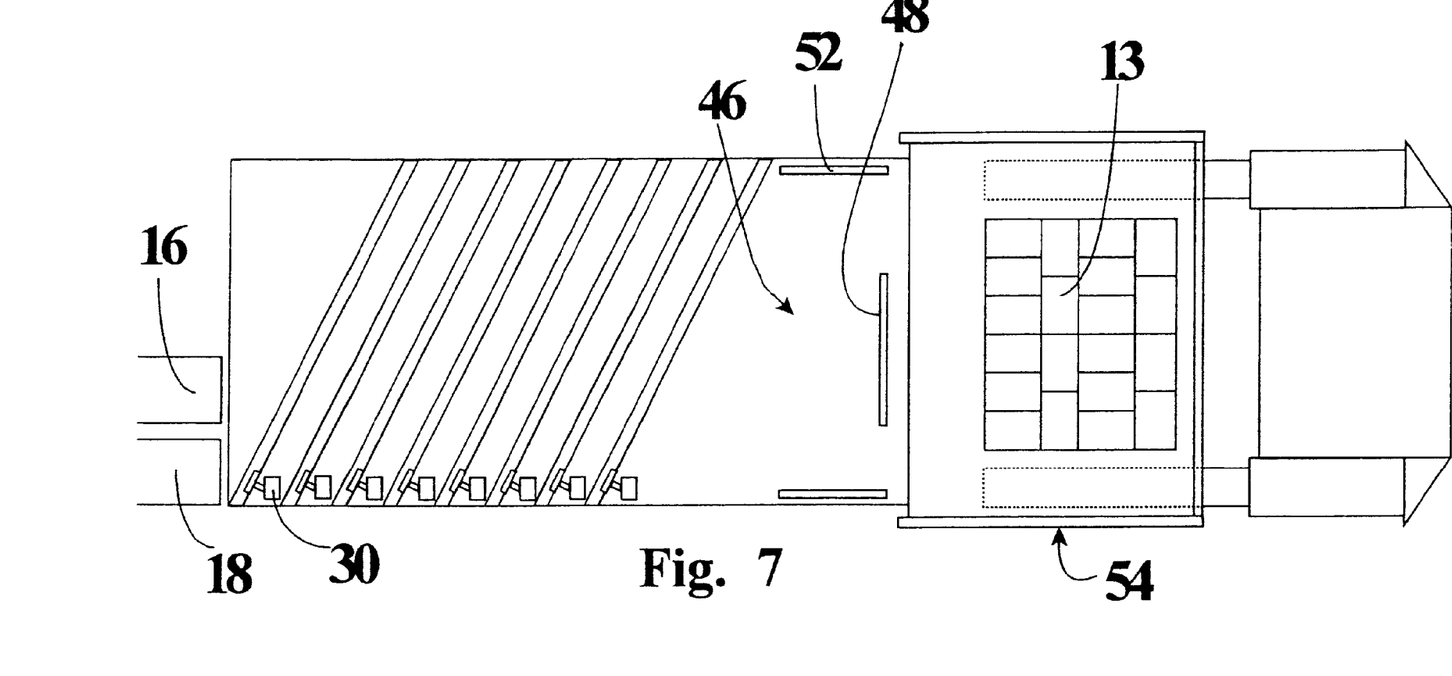
FIG. 7 is a top view of the package handling apparatus of the present invention and an associated forklift-type palletizer.
Figure 8:
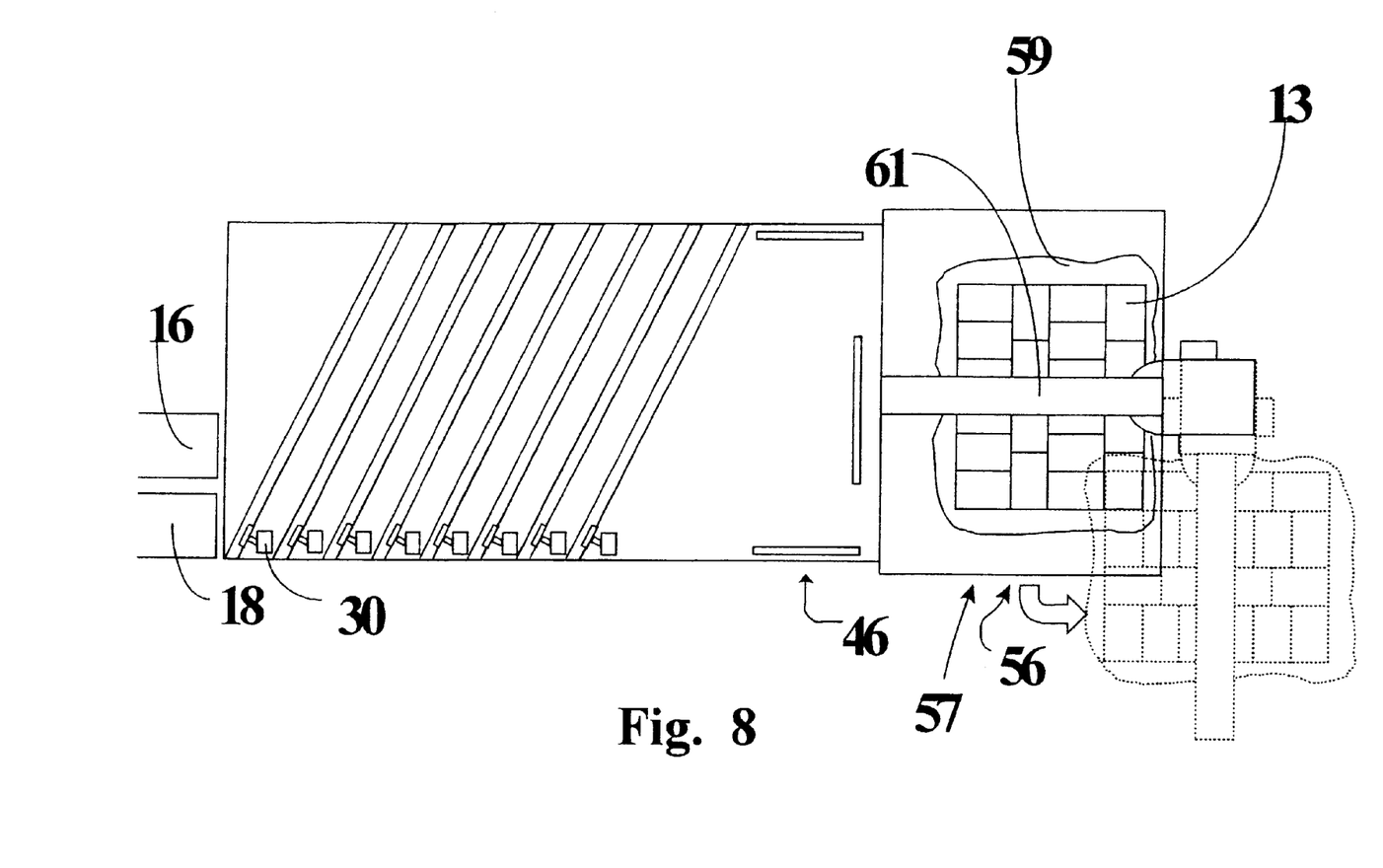
FIG. 8 is a top view of the package handling apparatus of the present invention and an associated rotary-type robot palletizer.

At a collection section 46 an accumulation stop-bar 48 positioned near the end of the pre-palletization conveyor 28 is selectively inserted (see arrow in FIG. 1) to stop the packages 12 assembled in layout 13 on the pre-palletization conveyor 28. A means for compressing the packages 12 assembled in layout 13 is provided by the stop-bar 48 and side compression bars 50, 52 which push the packages 12 into tight face-to-face engagement to compress the packages 12 into the desired layout 13. After compression, the stop-bar 48 is retracted, allowing the assembled layout 13 to be transferred onto a pallet stack either by a fork-lift type palletizer 54 (FIG. 7) or a rotary-robot palletizer 56 (FIG. 8). The rotary-robot palletizer 56 utilizes an overhead vacuum to pick up the layout 13 from a load station 57 just downstream from the compression section 46, rotates a pivoting arm 61 and places the layout 13 on the stack.

Figure 9:
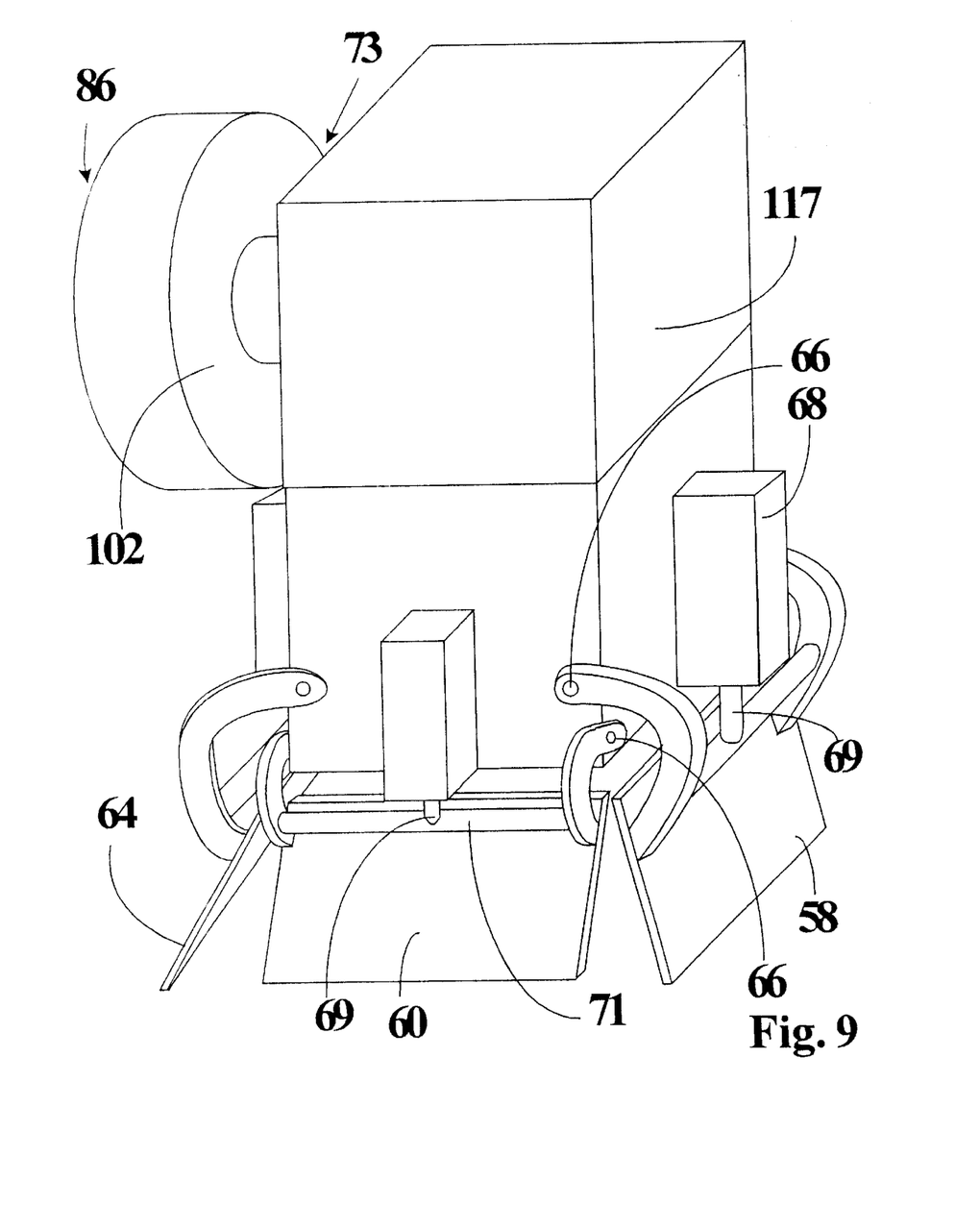
FIG. 9 is a detailed representation of the handler of the present invention, including a drive wheel, hinged flaps actuated by air cylinders and a rotary mechanism for turning.
Figure 10:
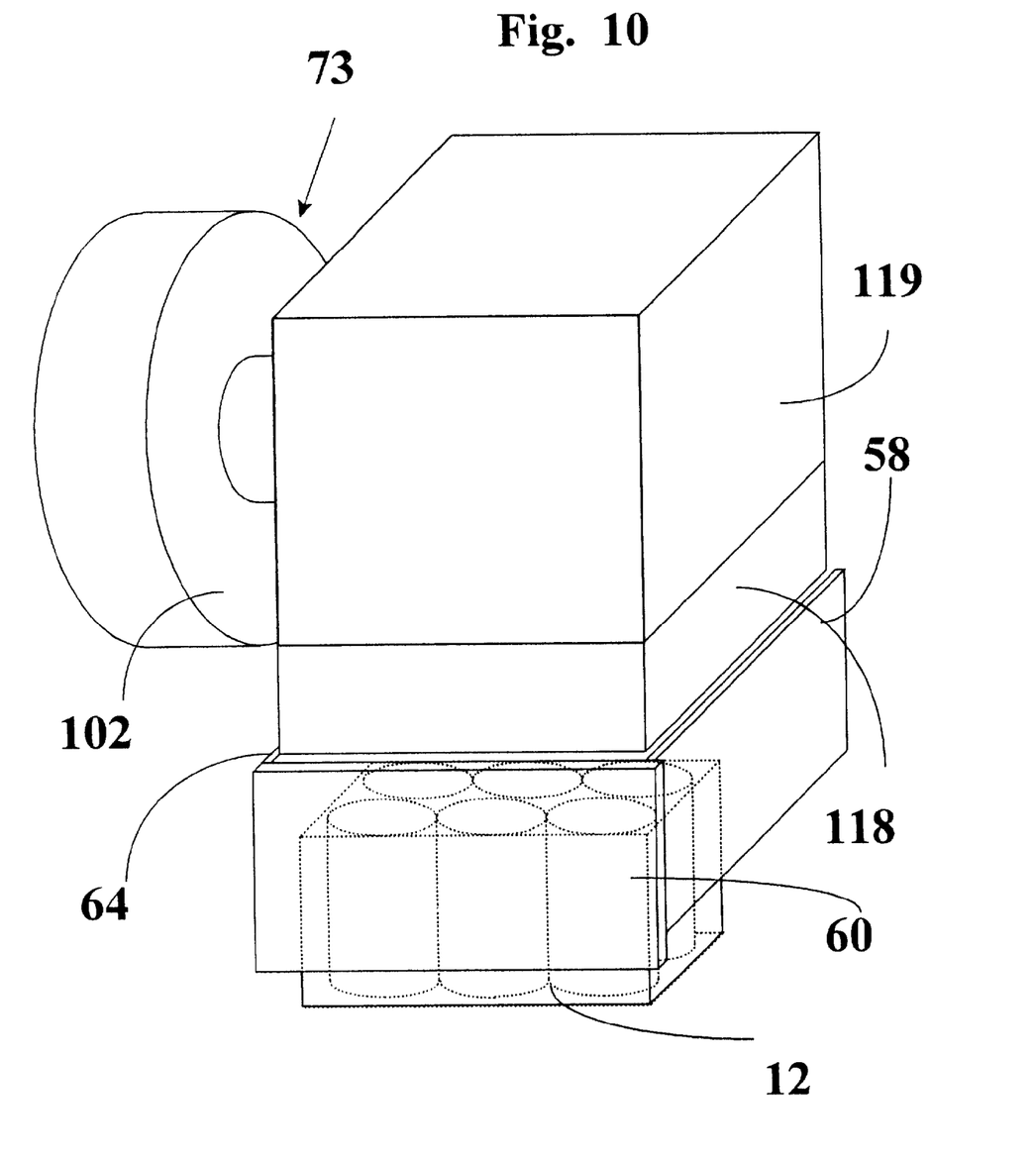
FIG. 10 is a perspective view of the handler of the present invention with the flaps collapsed to enclose a multi-pack of six beverage cans.

The utilization of eight (8) handlers 30, 32, 34, 36, 38. 40, 42, 44 to receive and position each of the packages 12 on the pre-palletization conveyor 28 eliminates the need for laning or other steering devices to guide the packages 12. While the preferred embodiment of the present invention discloses the use of eight (8) handlers 30, 32, 34, 36, 38, 40, 42, 44, it is specifically contemplated that more or less handlers may be used as speed dictates without the departing from the principles of the present invention. The handlers 30, 32, 34, 36, 38, 40, 42, 44 provide a means for receiving packages 12 because they are appropriately controlled to selectively operate a front flap 58, side flaps 60, 62 and a rear flap 64 around a package 12 (FIGS. 9 and 10). Each flap 58, 60, 62, 64 is closed onto or opens off of a package 12 as a result of rotation about hinge points 66. The flaps 58, 60, 62, 64 are mechanically designed and adjusted to collapse tightly to provide a means for gripping the package 12 for further processing. For all four (4) flaps 58, 60, 52, 64 an air cylinder 68 with an extending plunger 69 is provided and mechanically linked to a crossbar 71 mounted on the flaps 58, 60, 62, 64 (FIG. 9).

After the flaps 58, 60, 62, 64 have been closed around a package 12 (FIG. 10), a positioning means 73 is actuated and controlled which causes the handlers 30, 32, 34, 36, 38, 40, 42, 44 to travel along overhead suspended tracks 70, 72, 74, 76, 78 80, 82, 84. The tracks, 70, 72, 74, 76, 78, 80, 82, 84 define the axis of travel for the handlers 30, 32, 34, 36, 38, 40, 42, 44. Each of the packages 12 is properly positioned to create the desired layout 13 by controlling the distance of travel of the handler 30, 32, 35, 36, 38, 40, 42, 44 gripping the package 12 along its axis 70, 72, 74, 76, 78, 80, 82, 84 (FIG. 2).

The handlers 30, 32, 34, 36 38, 40, 42, 44 are driven along the tracks, 70, 72, 74, 76, 78, 80, 82, 84 by drive-means 86, 88, 90, 92, 94, 96, 98, 100 including driven wheels 102, 104, 106, 108, 110, 112, 114, 116 which engage and ride along the suspended tracks 70, 72, 74, 76, 78, 80, 82, 84.

Figure 11:
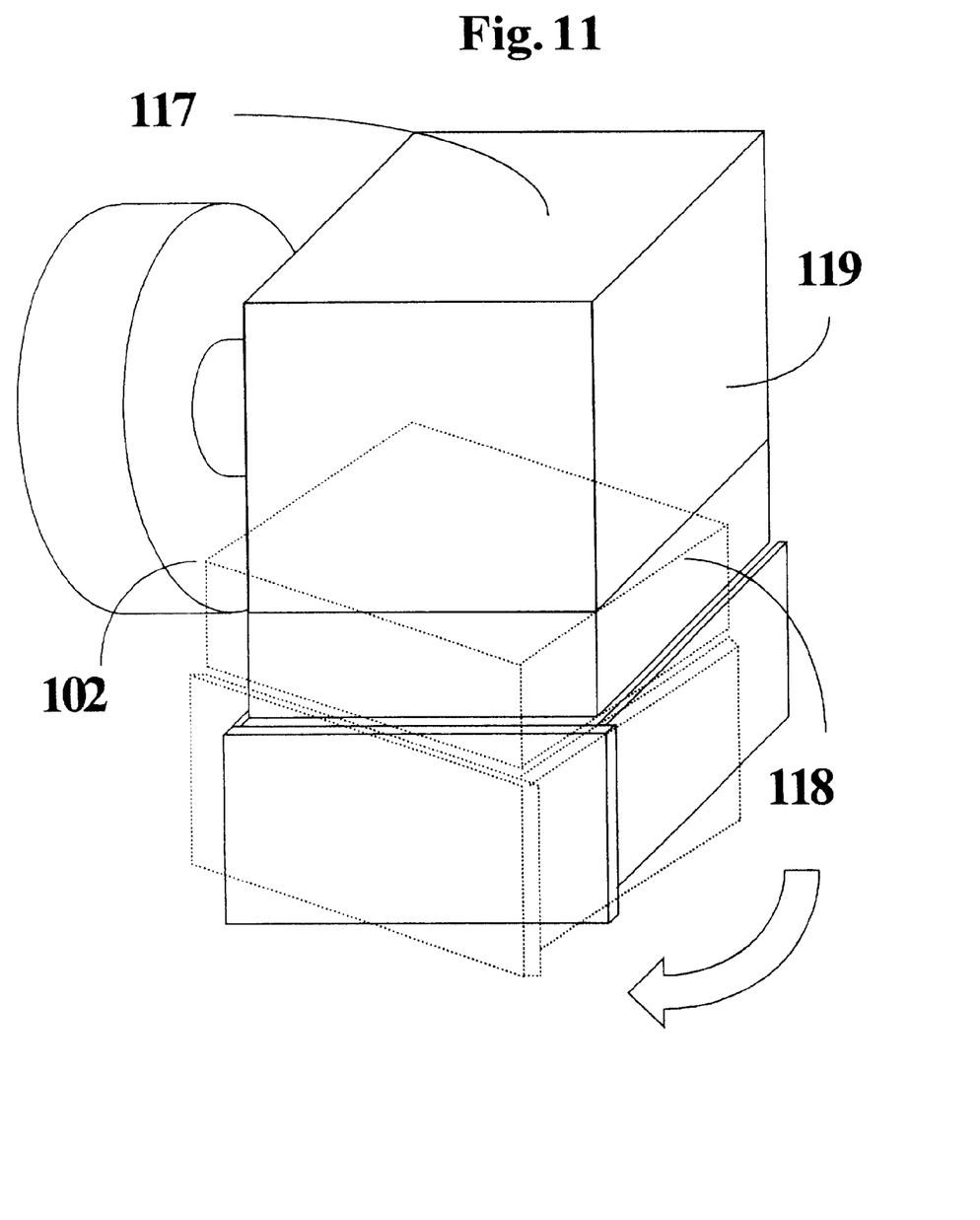
FIG. 11 is a perspective view of the handler shown with flaps collapsed and with rotation of the handler to alter orientation of the package depicted in phantom.

To achieve maximum flexibility and to get a desired layout, it is often necessary to selectively turn or alter the orientation of the packages 12. This is particularly important for packages 12 having rectagular dimensions of differing length and width. The handlers 30, 32, 34,36, 38, 40, 42, 44 are provided with a means for orienting the packages 12 comprising a rotary drive 117 such that the bottom portion 118 can rotate ninety (90) degrees relative to a top fixed portion 119 as depicted in FIG. 11. As a handler 30 is rotated, a package 12 enclosed by the flaps 58, 60, 62, 64 is also rotated to alter the orientation. Thus, the handlers 30, 32, 34, 36, 38, 40, 42, 44 are controlled to not only position the packages 12 on the pre-palletization conveyor 28 by defining the distance of travel along the axes 70, 72, 74, 76, 78, 80, 82, 84 on, they are also controlled to turn or not to turn to properly orient the packages 12 as necessary to achieve the desired layout 13.

Figure 12:
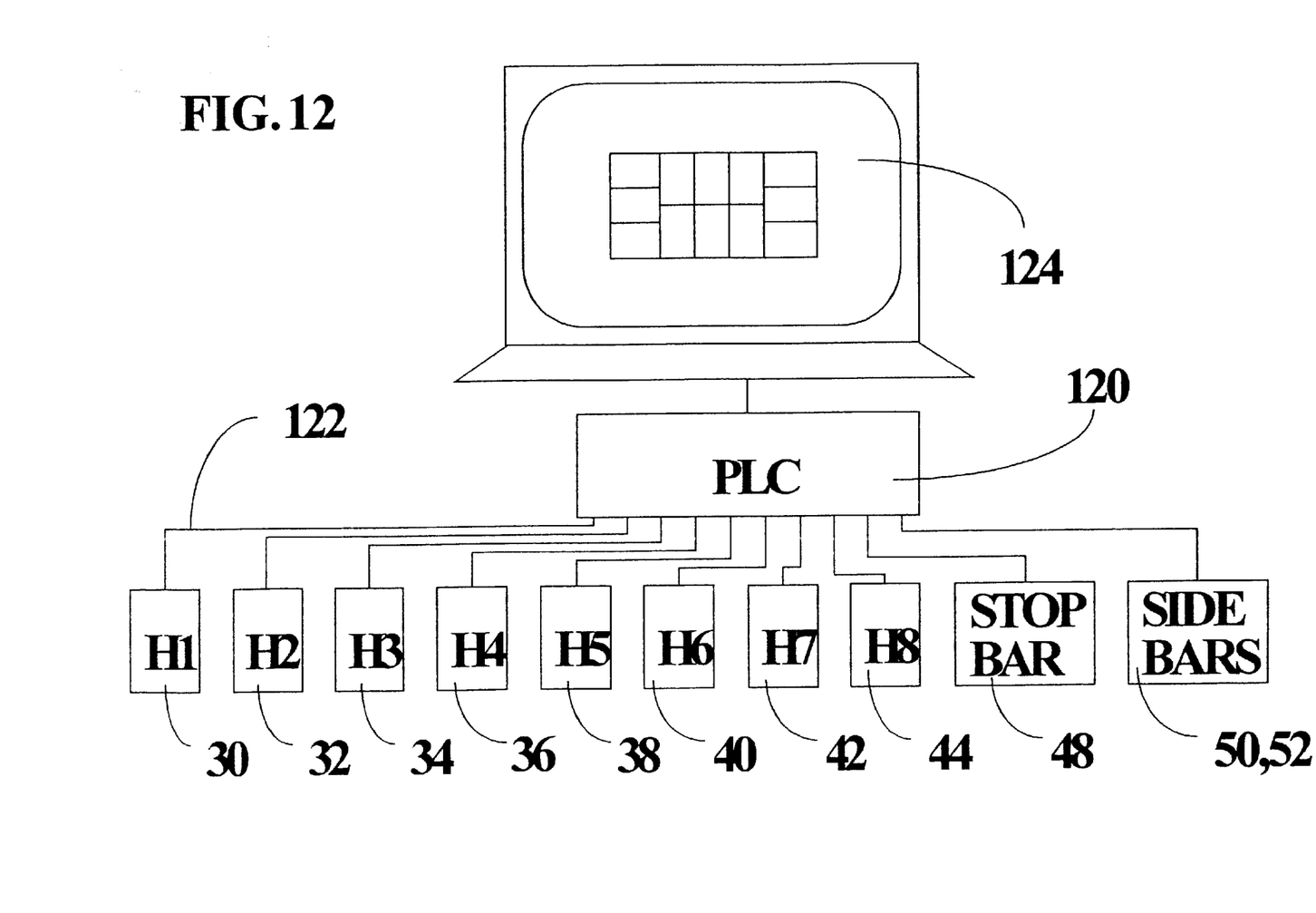
FIG. 12 is a schematic representation of the operator interface and control of the package handler of the present invention wherein a computer monitor communicates with a programmable logic controller which then send out signals to the package handlers.

The means for controlling the package handling apparatus 10, and specifically the handlers 30, 32, 34, 36, 38, 40, 42, 44 is provided by a programmable logic controller 120 which send signals to each handlers 30, 32, 34, 36, 38, 40, 42, 44 along communication lines 122 (FIG. 12). The programmable logic controller 120 sends a signal to each handler 30, 32, 34, 36, 38, 40, 42, 44 telling it to close the flaps 58, 60, 62, 64, how far to travel along its axis 70, 72, 74, 76, 78, 80, 82, 84, and whether or not the handler and package 12 should be turned and oriented, to achieve the desired layout 13. The programmable logic controller 120 also controls the accumulation stop bar 48 by sending signals to raise and lower the stop bar 48, and side compression bars 50, 52 by sending signals to close and open the side bars 50, 52.

An operator is provided a means for graphically presenting and defining the layout 13 of the packages 12 on a personal computer 124 as depicted in FIG. 12. The personal computer 124 communicates with the programmable logic controller 120 such that the programmable logic controller 120 sends the proper signals to the handlers 30, 32, 34, 36, 38, 40, 42, 44, the accumulation stop bar 48 and compression side bars 50, 52 to position, orient and compress the packages 12 to form the desired layout 13.

Another embodiment of the invention disclosed herein comprises a method for handling and assembling packages 12 into a desired layout 13. The principles of the present invention provide for the receiving of packages 12 from an infeed conveyor 14 by individual package handlers 30, 32, 34, 36, 38, 40, 42, 44. Defining the desired layout 13 for the packages 12 is then carried out by a user, and the desired layout 13 is communicated to a device 120 controlling the positioning and orienting of the packages 12. Next, the positioning and orienting of the packages 12 occurs on the pre-palletization conveyor 28 to conform with the desired layout 13. Finally, the assembled layout 13 of packages 12 is conveyed to a position at which the packages 12 are collected and compressed into the desired layout 13. The layout 13 is then placed on a pallet for shipment.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical appliaction to thereby enable one of ordinary skill in the art to best utilize the invention in various embodiments and with various modifications as are suited to the particular use contemplated. It is intended that the scope of the invention be defined by the claims appended hereto.

What is claimed is:

1. An apparatus for handling packages comprising:

a pre-palletization conveyor;

at least one handler means receiving said packages from an infeed conveyor, said at least one handler means comprising a means for positioning each of said packages on said pre-palletization conveyor, wherein said handler means comprises flaps that receive said packages and said positioning means comprises means for driving said at least one handler means along an axis;

a means for controlling said handler means and said positioning means to assemble said packages into a user-defined layout, wherein said controlling means is programmable and sends signals to each of said at least one handler means to properly position each said package on said pre-palletization conveyor;

a means for compressing said packages on said pre-palletization conveyor into said user-defined layout;

means for orienting said packages on said pre-palletization conveyor wherein said programmable means for controlling further provides means for controlling said orienting means; and wherein said orienting means comprises means for rotating a portion of said at least one handler means.

2. The apparatus as set forth in claim 1 further comprising a means for graphically presenting said user-defined layout.

3. The apparatus as set forth in claim 2 wherein said graphically presenting means comprises a computer.

4. The apparatus as set forth in claim 3 wherein said computer provides a means for defining a layout of packages to form a layer of a palletized stack.

5. The apparatus as set forth in claim 4 wherein said programmable means for controlling comprises a programmable logic controller in communication with said computer.

6. A method for handling and assembling packages into a user defined layout comprising the steps of:

receiving packages with individual handlers from an infeed conveyor;

defining a desired layout of packages;

communicating the desired layout of packages to a device controlling the positioning and orienting of the packages;

positioning each of said packages onto a pre-palletization conveyor to conform with the desired layout;

orienting packages on a pre-palletization conveyor to conform with the desired layout;

conveying the positioned and oriented packages to a compression station;

compressing the packages into face-to-face engagement in the desired layout placing the layer onto a pallet.

* * * * *